(12) United States Patent
Goodbred et al.

(10) Patent No.: US 7,082,854 B2
(45) Date of Patent: Aug. 1, 2006

(54) POSITIVE ENGAGEMENT LATCH MECHANISM WITH MULTIPLE LOADING FEATURES

(75) Inventors: Neil G. Goodbred, Northville, MI (US); David J. Abdella, Shelby Township, MI (US)

(73) Assignee: Lear Corporation, Southfield, MI (US)

( * ) Notice: Subject to any disclaimer, the term of this patent is extended or adjusted under 35 U.S.C. 154(b) by 29 days.

(21) Appl. No.: 10/249,185

(22) Filed: Mar. 20, 2003

(65) Prior Publication Data

US 2004/0182983 A1  Sep. 23, 2004

(51) Int. Cl.
  *G05G 5/06* (2006.01)
  *B60N 2/08* (2006.01)
(52) U.S. Cl. ............................ 74/527; 248/429; 74/526
(58) Field of Classification Search ................ 248/424, 248/429, 430; 297/341, 344.1; 296/65.13, 296/65.14, 65.15
  See application file for complete search history.

(56) References Cited

U.S. PATENT DOCUMENTS

| | | | | |
|---|---|---|---|---|
| 4,189,957 A | * | 2/1980 | Gedig et al. .................. 74/535 |
| 4,712,759 A | * | 12/1987 | Sugama et al. .............. 248/429 |
| 5,020,853 A | * | 6/1991 | Babbs .......................... 297/341 |
| 5,172,882 A | * | 12/1992 | Nini ............................. 248/430 |
| 5,234,189 A | * | 8/1993 | Myers .......................... 248/429 |
| 5,564,315 A | * | 10/1996 | Schuler et al. ................ 74/527 |
| 5,596,910 A | * | 1/1997 | Bauer et al. .................. 74/526 |
| 5,741,000 A | * | 4/1998 | Goodbred .................... 248/430 |
| 5,782,138 A | * | 7/1998 | Groche ......................... 74/527 |
| 5,816,110 A | * | 10/1998 | Schuler et al. ................ 74/527 |
| 5,848,775 A | * | 12/1998 | Isomura et al. ............. 248/430 |
| 5,913,947 A | * | 6/1999 | Groche ......................... 74/527 |
| 5,918,846 A | * | 7/1999 | Garrido ........................ 248/429 |
| 6,308,589 B1 | * | 10/2001 | Schuler et al. ................ 74/538 |
| 6,354,553 B1 | | 3/2002 | Lagerweij et al. |
| 6,637,712 B1 | * | 10/2003 | Lagerweij .................... 248/429 |
| 6,764,054 B1 | * | 7/2004 | Becker et al. ............... 248/429 |
| 2002/0079418 A1 | * | 6/2002 | Tame et al. .................. 248/429 |
| 2003/0006355 A1 | * | 1/2003 | Horsfield et al. ............ 248/429 |
| 2003/0164434 A1 | * | 9/2003 | Frohnhaus et al. ......... 248/430 |
| 2004/0026975 A1 | * | 2/2004 | Rausch et al. ............ 297/344.1 |
| 2004/0164218 A1 | * | 8/2004 | Yokota ......................... 248/430 |
| 2004/0222348 A1 | * | 11/2004 | Yokota ......................... 248/429 |

* cited by examiner

*Primary Examiner*—Anita M. King
(74) *Attorney, Agent, or Firm*—Earl J. LaFontaine (57) ABSTRACT

A positive engagement latching mechanism (22) for a seat assembly (10) of a vehicle includes a track member (28) having a multiple apertures (30), each of which having nonuniform width. Multiple engageable devices (42), each having a tapered engagement portion (52), positively engage in the apertures (30). A latching mechanism engagement-maintaining system (24) for a seat track assembly (12) of the seat assembly (10) includes an engageable device housing (40) having a tapered sides (46) that corresponds with a contour of an adjacent track member edge (48). A shear load resistive device (88) is coupled to the housing (40) and a track member (26) and resists vertical travel of the track member (26) in relation to the housing (40). A load guide (90) is coupled to the housing (40) and to the track member (26) and guides direction of travel of the track member (26) under loading conditions.

20 Claims, 4 Drawing Sheets

POSITIVE ENGAGEMENT LATCH MECHANISM WITH MULTIPLE LOADING FEATURES

BACKGROUND OF INVENTION

The present invention relates to seat track assemblies, and more particularly, to apparatuses for positive engagement of seat tracks and loading thereof.

Seat track assemblies are common within automotive vehicles for displacement of seat assemblies in fore and aft directions. Seat track assemblies typically include a pair of parallely spaced track assemblies; each track assembly includes an upper track that resides in translational relationship with a lower track. The lower track is rigidly fixed to a vehicle structure whereas the upper track is coupled to a seat pan and is able to be translated in relation to the lower track.

The seat track assemblies include a latching mechanism, which is commonly coupled to the upper track and is used to secure the upper track to the lower track. The latch mechanism, for example, may include a bracket with a series of teeth that are rigidly coupled to the upper track and which engage with a series of apertures in the lower bracket. To adjust position of the seat assembly a release lever is operated to release or disengage the pins from the apertures. Once in an approximately desired position the release lever again is operated or released into an engaged position to engage the pins and lock the upper track to the lower track.

It is desirable for a latching mechanism to provide positive continuous engagement, hereinafter referred to as positive engagement. Positive engagement describes the situation when the release lever is actuated and the latch mechanism returns to a locked state or an engaged state without physically adjusting position of the upper track in relation to the lower track.

Several positive engagement seat track latching mechanisms currently exist. Each positive engagement mechanism typically, has a series of spring-loaded pawls or pins that are coupled to an upper track and independently engage with a series of apertures in a lower track. When a corresponding release lever is operated one or more of the pins engage with the apertures. The apertures are rectangular in shape and have a length in the fore and aft direction that is significantly larger than that of width of the pins and a distance between apertures that is approximately equal to width of the pins, such that at least one pin always is engaged when the release lever is in an engaged position.

It is also desirable to provide desired loading resilience, which often corresponds with having at least two pins engaged at all times. With current positive engagement mechanisms a situation exists when a single pin is engaged and is within a center position of an aperture, such that other remaining pins are not engaged. When in this situation, in order to engage a second pin the upper track needs to be physically adjusted in relation to the lower track to engage a second pin and rigidly fix the upper track member to the lower track member. Amount of displacement required by the upper track in relation to the lower track to engage the second pin is referred to as resolution.

It is further desirable for a seat latching mechanism to have minimum resolution. The lower the resolution the better the perceived impression by a seat operator of a seat assembly having infinite adjustability. Unfortunately, resolution of existing seat track assemblies is high, such that the upper track may need to be adjusted as much as 6 mm to engage a second pin.

Also, current positive engagement seat track assemblies do not provide additional or aid in maintaining engagement of the pins during a vehicle collision. During a vehicle collision, due to vertical load on a seat assembly, gap between an upper seat track and a lower seat track may increase causing one or more pins to disengage, thereby releasing the upper track in relation to the lower track.

It is therefore desirable to provide a positive engagement seat track assembly that has minimal resolution, has features for maintaining engagement of seat tracks, is cost effective, and provides manufacturing ease.

SUMMARY OF INVENTION

The present invention addresses the issues described above and provides apparatuses for positive engagement of seat tracks and loading thereof. A positive engagement latching mechanism for a seat assembly of a vehicle is provided. The latching mechanism includes a track member having multiple apertures, each of which having nonuniform width. Multiple engageable devices, each having a tapered engagement portion, positively engage in the apertures.

A latching mechanism engagement-maintaining system for a seat track assembly is also provided. The engagement-maintaining system includes an engageable device housing having tapered sides that correspond with a contour of an adjacent track member edge. A shear load resistive device is coupled to the housing and a track member and resists vertical travel of the track member in relation to the housing. A load guide is coupled to the housing and to the track member and guides direction of travel of the track member under loading conditions.

One of several advantages of the present invention is that it provides a positive latching mechanism with decreased resolution, thus providing a positive seat latching mechanism that provides improved seat adjustability.

Another advantage of the present invention is that it provides an engagement-maintaining mechanism that aids in maintaining engagement of the engageable devices, such as engagement pins, within the apertures.

Furthermore, the present invention provides additional load resilience of the latching mechanism and aids in preventing translation and separation between track members during a collision event.

Moreover, the present invention provides a compact design that is capable of being implemented within limited spatial design constraints.

The present invention itself, together with further objects and attendant advantages, will be best understood by reference to the following detailed description, taken in conjunction with the accompanying drawing.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

In the following figures the same reference numerals will be used to refer to the same components. While the present invention is described with respect to apparatuses for positive engagement of seat tracks and loading thereof, the present invention may be adapted and applied to various applications including: latching mechanisms, seat track assemblies, seating systems, vehicle and non-vehicle systems, or other applications known in the art.

In the following description, various operating parameters and components are described for one constructed embodiment. These specific parameters and components are included as examples and are not meant to be limiting.

Figure 1:
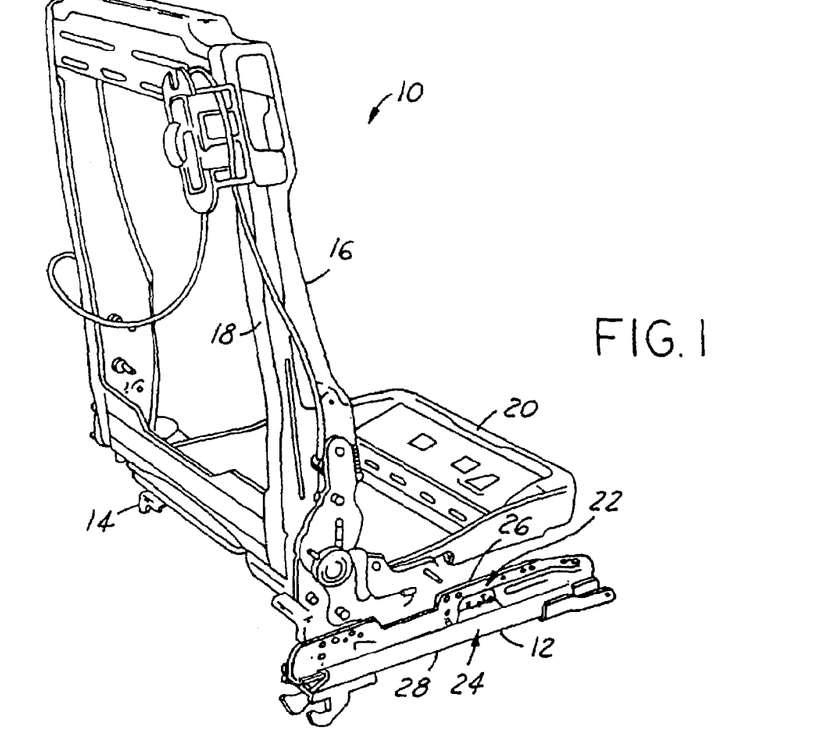
FIG. 1 is a rear perspective view of a seat assembly for a vehicle incorporating seat track assemblies in accordance with an embodiment of the present invention.

Referring now to FIG. 1, a perspective view of a seat assembly 10 for a vehicle, is shown, incorporating a primary seat track assembly 12 and a secondary seat track assembly 14 in accordance with an embodiment of the present invention. The seat assembly 10 includes a seat back 16 having a seat frame 18, which is coupled to a seat pan 20. The track assemblies 12 and 14 are in parallel relation to each other and are coupled to the seat pan 20. The track assemblies 12 and 14 provide fore and aft position adjustment of the seat assembly and are intended for mounting to a vehicle floor (not shown) by any of a variety of methods known in the art.

Figure 6:
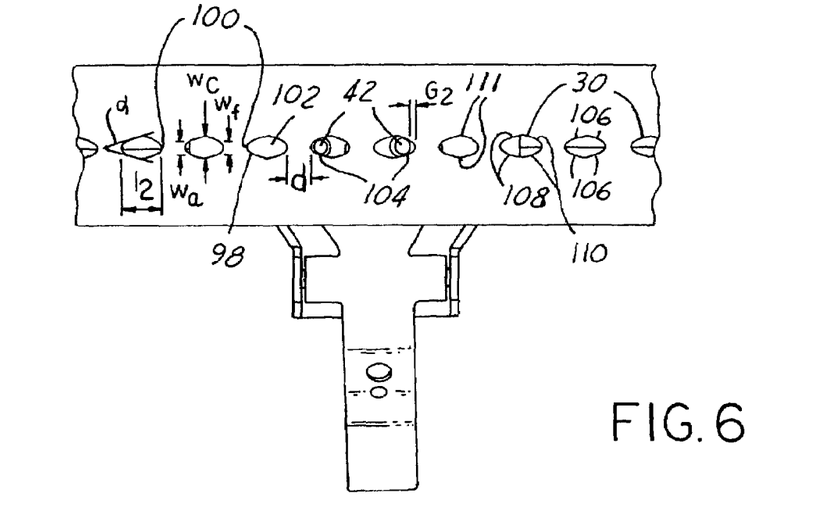
FIG. 6 is close-up bottom view of the positive latching mechanism in accordance with an embodiment of the present invention.

The primary seat track assembly 12 includes a positive engagement latching mechanism 22 and a latch mechanism engagement-maintaining system 24, which are coupled to an upper seat track member 26 and a lower seat track member 28. The upper track member 26 is translatable in relation to the lower track member 28 via the positive latching mechanism 22 for positive engagement of the upper track member 26 with the lower track member 28. The lower track member 28 has multiple apertures 30 associated with multiple engagement points and corresponding seat positions. The apertures 30 are best seen in FIG. 6.

Figure 2:
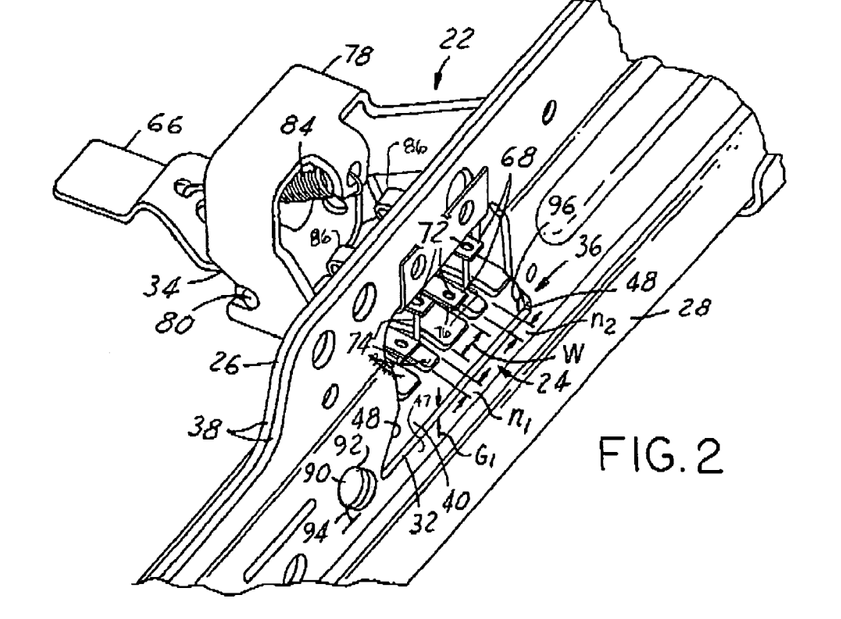
FIG. 2 is a close-up upper perspective view of a positive latching mechanism and of a latch mechanism engagement-maintaining system in accordance with an embodiment of the present invention.
Figure 3:
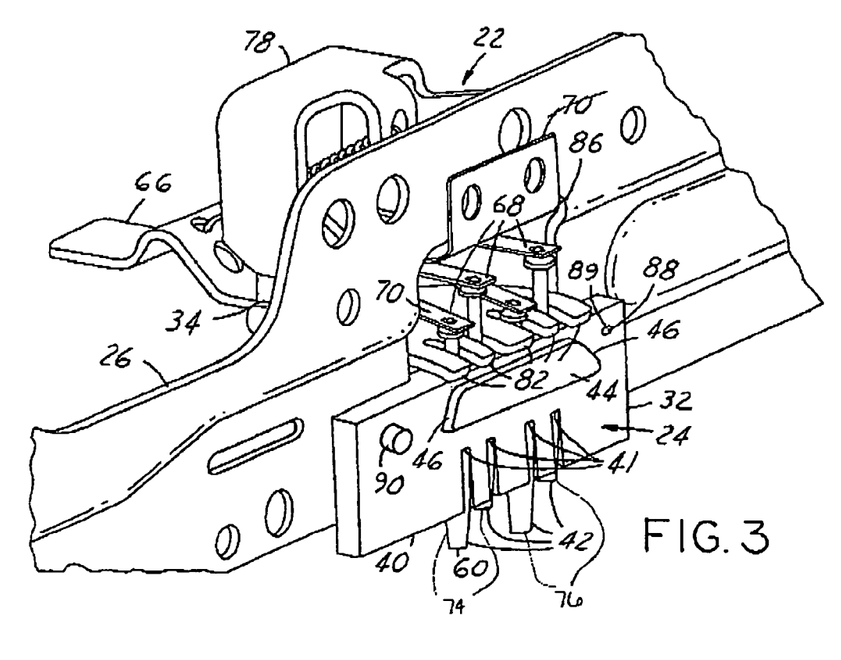
FIG. 3 is a close-up inner perspective view of a positive latching mechanism and of a latch mechanism engagement-maintaining system in accordance with an embodiment of the present invention.
Figures 4, 5:
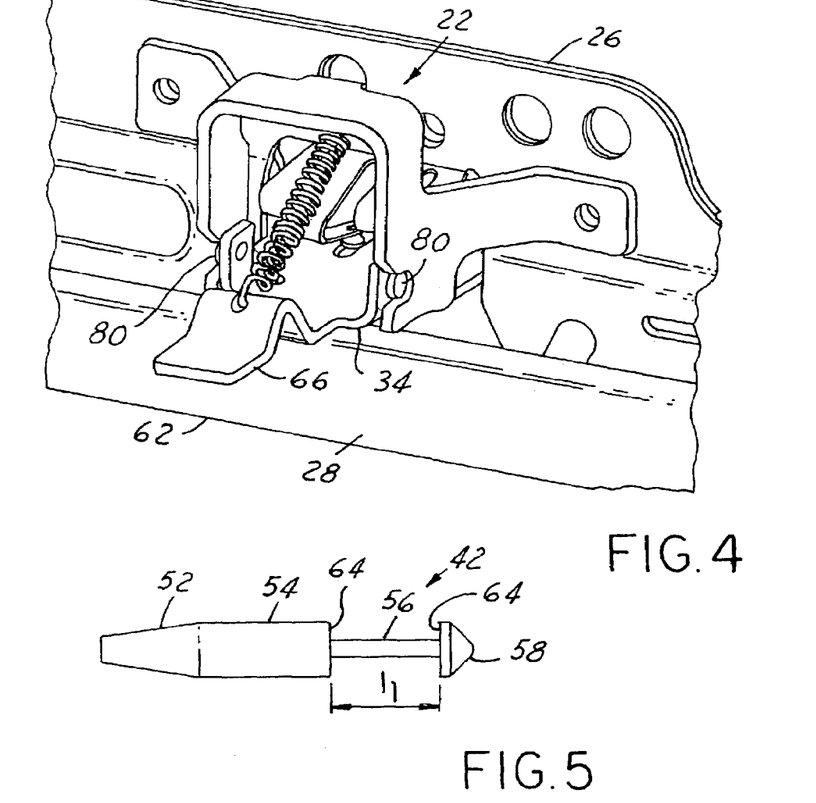
FIG. 4 is a close-up outer perspective view of a positive latching mechanism and of a latch mechanism engagement-maintaining system in accordance with an embodiment of the present invention.
FIG. 5 is a side view of an engageable device in accordance with an embodiment of the present invention.

Referring now to FIGS. 2, 3, and 4, close-up upper, inner, and outer perspective views of the positive latching mechanism 22 and of the engagement-maintaining system 24 in accordance with embodiments of the present invention are shown. The positive latching mechanism 22 provides a low level of resolution, as will become more evident with review of the following description. The engagement-maintaining system 24 aids in maintaining engagement between the upper track member 26 and the lower track member 28 during forward loading, such as in a collision situation, which will also become more evident with review of the following description.

The positive latching mechanism 22 includes an engageable member housing assembly 32, a release lever assembly 34, and the lower track member 28.

The housing assembly 32 resides in a center portion 36 of the upper track segments 38 and includes a main housing 40 with multiple engageable devices 42 contained at least partially therein. The housing 40 has a protruding and generally wedged shaped inner section 44 that has tapered edges 46, which are adjacent to and abut inner edges 48 of the upper track member 26. The housing 40 serves multiple functions. The housing 40 provides inner slots 41 for the engageable devices 42, such as pins, which reside and are operable therein. Although, four engageable devices are shown, any number may be used. The housing 40 also serves to maintain engagement of the devices 42 in the apertures 30, which is discussed in further detail below. A load gap $G_1$ exists between bottom surface 47 of the inner section 44 and the upper track member 26. The gap $G_1$ allows for shifting of the housing 40 relative to the upper track member 26, which is described in further detail below.

Figure 7:
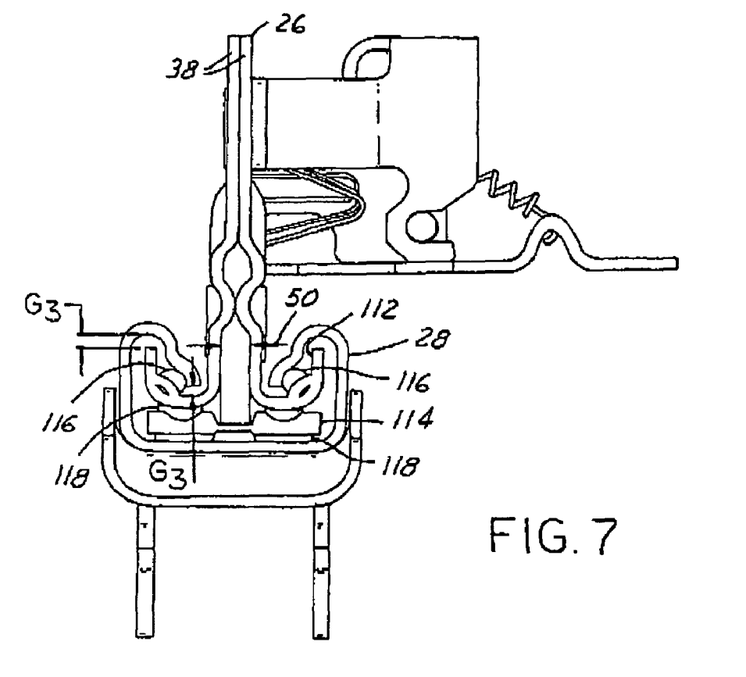
FIG. 7 is a front view of the seat track assembly in accordance with an embodiment of the present invention.

The engageable devices 42 extend vertically across a center gap 50, as best seen in FIG. 7, between the segments 38 and within the housing 40 to positively engage in the lower track member 28 by extending in and through the apertures 30. The engageable devices 42 may be of various size, shape, type, and style known in the art.

Referring now also to FIG. 5, a side view of one of the engageable devices 42 in accordance with an embodiment of the present invention is shown. Although, the engageable devices 42 are shown as being uniform in size and shape their size and shape may vary. Each engageable device 42 has a tapered engagement portion 52, a main shaft portion 54, a recessed section 56, and a head 58. The engageable devices 42, as well as other components of the present invention, may be of various size and formed of various materials. In one embodiment, in order to satisfy confined design restraints, the engageable devices 42 are sized relatively small to fit within the center gap 50 and are formed of 4130 steel followed by being heat treated, to increase strength of the devices 42.

The tapered portions 52 provide a depth range of engagement, such that each engagement position of the engageable devices 42 corresponds to a different depth of engagement. Depth of engagement refers to amount the tapered portions 52 extend within and protrude from the apertures 30. When an engageable device 42 is engaged, the tapered portion 52 may be partially through a corresponding aperture 30, such that a tip 60 of the engageable device 42 is flush with a bottom surface 62 of the lower track member 28 or may be fully extended through an aperture 30, such that at least a majority of the tapered portion 52 is through the aperture 30. The tapered portion 52, in conjunction with the apertures 30, aid in increasing number of engagement positions for a given distance of travel of the upper track member 26 relative to the lower track segment 28, thus decreasing resolution and increasing adjustment capability. The main shaft portion 54 resides within the slots 41 and is held and guided by the slots 41 so that the engageable devices 42 are operable in a vertical direction.

The tapered portions 52 also have a shallow or locking angle that prevents the engageable devices 42 from becoming disengaged in a collision. The locking angle prevents the devices 42 from freely sliding in a vertical direction and thus becoming disengaged.

The recessed sections 56 have length $l_1$ that corresponds with displacement of the engageable devices 42. The engageable devices 42 have a fully extended engaged state and a minimally extended engaged state corresponding to recessed ends 64 of the recessed portions 56. When the engageable devices 42 are in a fully extended engaged state the heads 58 are in contact with a release lever 66. When the engageable devices 42 are in a minimally extended engaged state the main shaft portions 54 are in contact with the lever 66.

Figure 8:
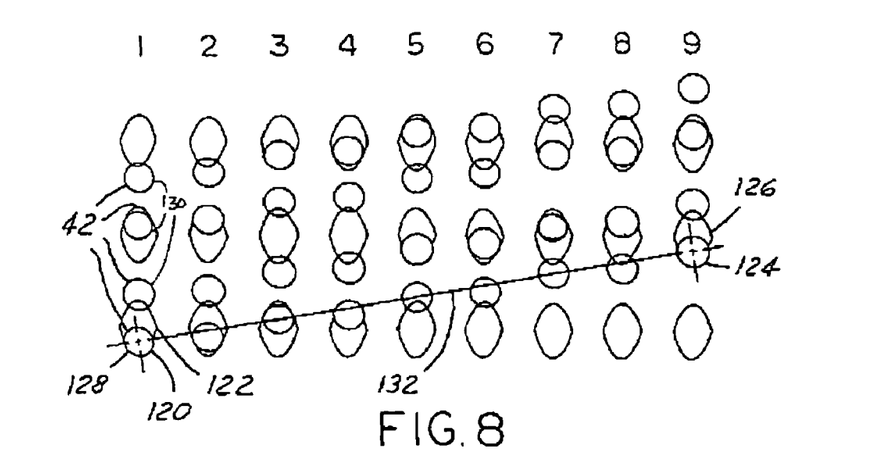
FIG. 8 is an engagement pattern plot illustrating linearity of engagement for multiple engageable devices in accordance with an embodiment of the present invention.

The heads 58 are shaped to be held by biasing member ends 68 of biasing members 70 (four are shown). In embodiment of FIG. 1–5, the heads 58 are conical in shape and are held within holes 72 in the biasing members 70. Of course, other techniques known in the art may be used to maintain contact between the devices 42 and the biasing members 70. Engageable states of the devices 42 are best seen in FIG. 8.

Also, in the embodiment of FIG. 1–5, a first separation distance n exists between a first pair of engageable devices 74 and a second separation distance $n_2$ exists between a second pair of engageable devices 76. The first separation distance n is approximately equal to the second separation distance $n_2$. Distance between device pairs, designated as w, or distance between the first pair of engageable devices 74 and the second pair of engageable devices 76 is twice that of the first separation distance $n_1$ and the second separation distance $n_2$. The slots 41 are spatially arranged in the housing 40, such that the above-stated engageable device spacing arrangement coincides therein.

The release lever assembly 34 includes the release lever 66 that is operable to release engagement of the devices 42. The release lever 66 when operated allows the upper track member 26 to be positioned relative to the lower track member 28. The release lever 66 is coupled to a release lever mounting bracket 78 at a pair of pivot points 80. The release lever 66 includes multiple fingers or forks 82 that are used to lift and release the devices 42. The forks 82 are also appropriately and similarly spaced as the slots 41 and the devices 42 for proper operation of the devices 42. The forks 82 prevent the engageable devices 42 from retracting away from the lower track member 28 beyond a predetermined point, which corresponds to when the main shaft 54 is in contact with the forks 82.

The release lever 66 and the engageable devices 42 are biased by a biasing member 84 and the biasing members 70. In one embodiment of the present invention, the release lever 66 is biased by a latch return spring and the engageable members 42 are each biased by leaf springs, as shown. The biasing member 84 maintains engaged position of the release lever 66. The biasing members 70 provide smooth operation of and prevent rattling of the engageable devices 42 by maintaining a constant pressure on the devices 42 and in effect somewhat holding the devices 42. The biasing members 70 bias the devices 42, such that they are at least partially extended in and through the apertures 30 when the release lever 66 is actuated. Any number of biasing members may be used and the biasing members 70 and 84 may be of various size, shape, and type, as known in the art. Although the biasing members 70 are shown as being part of a single integral component and each biasing member therein has two bends 86, the biasing members 70 may be separate components and have any number of bends.

The engagement-maintaining system 24 includes the housing 40, which performs as a load guide, a shear load resistive device 88, and an additional load guide 90. As stated above, the housing 40 has a tapered or wedged shaped edges 46 that increase in width closer to the lower track member 28. The edges 46 correspond with contours of the inner edges 48. Distance between the inner edges 48 also increases closer to the lower track member 28. The shear load device 88 couples the housing 40 to the upper track member 26 and resists displacement of the track member 26 in relation to the housing 40 up to a predetermined load. The shear load device 88 may be a shear pin or some other load resistive device known in the art. The shear load device 88 extends through shear load device holes 89 in the upper track member 26 and in the housing 40.

The load guide 90 is coupled to the housing 40 and aids in guiding direction of travel of the upper track member 26 under loading conditions. The load guide 90 may be an integral part of the housing 40, as shown. Although, the load guide 90 is shown as a circular guide tab that resides in a track member slot 92, it may be in some other form known in the art.

In operation and during a collision, as load, having vertical and horizontal components, on the upper track member 26 increases, the load resistive device 88 shears at a predetermined load allowing the upper track member 26 to shift in a forward and vertical direction relative to the housing 40. The housing 40 and the load guide 90 direct the track member 26 to travel in a forward and upward direction. The upper track member 26 is guided in a forward and upward direction as directed by angle 94 of the slot 92 and angle 96 of the edges 46, which are approximately equal. As the upper track member 26 moves in a forward and upward direction the housing 40 is forced in an opposing downward direction as to aid in securing engagement of the devices 42 in the apertures 30. As the upper track member 26 shifts in a forward and upward direction and the housing 40 shifts in a opposing direction, an additional engageable device 42 may engage in one of the apertures 30, further preventing forward movement of the upper track member 26 relative to the lower track member 28.

Thus, the engageable devices 42 that are engaged during normal operation in combination with the latching mechanism 22 may be considered to be primary engagement devices, where as engageable devices 42 that engage during a collision and devices that aid in maintaining engagement thereof, such as the maintaining system 24, may be considered secondary engagement devices.

Referring now also to FIG. 6, is close-up bottom view of the seat track assembly 12 in accordance with an embodiment of the present invention is shown. Each aperture 30 is quadrilaterally shaped, with nonuniform width, has length 12, and has opposing arches 98. Width of the apertures 30 is measured in a perpendicular direction to that of the length $l_2$. Width of the apertures 30 is less at fore and aft edges 100, represented by $w_a$ and $w_f$, respectfully, than across centers 102 of the apertures 30, represented by $w_c$. The arches 98 have contours 104 that correspond with shape of the engageable devices 42. Each arch 98 has adjacent sides 106 that are at an angle α. A first pair of adjacent sides 108 diverge towards the center 102 and a second pair of adjacent sides 110 converge towards the center 102. Although, the apertures 30 have sides 106 that meet at points 111, they may include or be adjacent to additional arches or shaped edges.

Each engageable device 42 has a minimum position depth diameter $P_{min}$, that corresponds to when the tapered portion 52 is in contact with the arches 98, and a maximum position depth diameter $P_{max}$, when the tapered portion 52 is fully extended through the aperture 30. In the fully extended position the tapered portion 52 is not in contact with fore or aft edges 100 of the arches 98, but rather is in contact with the sides 106 and is generally closer to or approximately in the center 102. A device edge gap $G_2$ exists between the tapered portion 52 and the arches 98 when in the fully extended position. Distance d exists between the apertures 30, and in the example as shown, is uniform between all of the apertures 30, although it may vary. Also, although the apertures 30 are shown as being uniform in size and shape they may be nonuniform.

In a preferred embodiment, a relationship exists, for four possible engaged states of the four engageable devices 42, between the separation distances $n_1$ and $n_2$, the distance between device pairs $w_2$, the minimum depth diameter $P_{min}$, the maximum depth diameter $P_{max}$, the device edge gap $G_2$, the length $l_2$, and the distance between apertures d, which is represented by equation 1: $n+w_2+\frac{1}{2}(P_{min})+\frac{1}{2}(P_{max})+G_2=2l_2+d$ (1) The separation distances $n_1$ and $n_2$ are represented by n, since separation distance $n_1$ is approximately equal to separation distance $n_2$. An example as to determining the above stated values is described in the method of FIG. 9.

The four possible engaged states of the engageable devices 42, refers to which engageable devices 42 are engaged at any point in time, but does not refer to all possible engaged states of each engageable device 42. For example, at any point in time a first and a third device may be engaged, a first and a fourth device may be engaged, a second and a third device may be engaged, or a second and a fourth device may be engaged for the sample embodiment as described in FIGS. 1–6 and as better illustrated in states of FIG. 8.

Referring now to FIG. 7, a front view of the seat track assembly 12 in accordance with an embodiment of the present invention is shown. The upper track member 26 includes the upper track segments 38 which each have a channel 112. A track gap $G_3$ exists between the upper track 26 and the lower track 28.

A roller cage 114 resides between the upper track member 26 and the lower track member 28 and allows the upper track member 26 to slide relative to the lower track member 28. A pair of bearing sets 116 (only one is shown) exist between the upper track member 26 and the cage 114. A series of rollers 18 exists within cage 114 and between the channels 112 and the lower track member 28. The bearing sets 116 and the rollers 118 are lubricated and provide low friction between the upper track member 26 and the lower track member 28 as to enable ease in sliding the upper track member 26 relative to the lower track member 28. The roller cage 114 is one possible example of a technique for providing stability, reduced "play", and reduced friction between the upper track member 26 and the lower track member 28.

A track member gap $G_3$ exists between the upper track member 26 and the lower track member 28. The track member gap $G_3$ is approximately equal to the load gap $G_1$ During a loading conditions gaps $G_1$ and $G_3$ decrease in size.

Referring now to FIG. 8, an engagement pattern plot illustrating linearity of engagement for multiple engageable devices 42 in accordance with an embodiment of the present invention is shown. Continuing from the above-described embodiment of FIG. 1–5, when four engageable devices are used there may exist nine possible engaged states for a single device between a fore edge 120 of a first aperture 122 and a fore edge 124 of an adjacent aperture 126. These nine states or positions for a first engageable device 128 are shown, a long with corresponding states of the other engageable devices 130. The nine positions of the first engageable device 128 are approximately linear in nature, as represented by line 132. Approximate linearity of the different positions further shows increased adjustability of the present invention.

Figure 9:
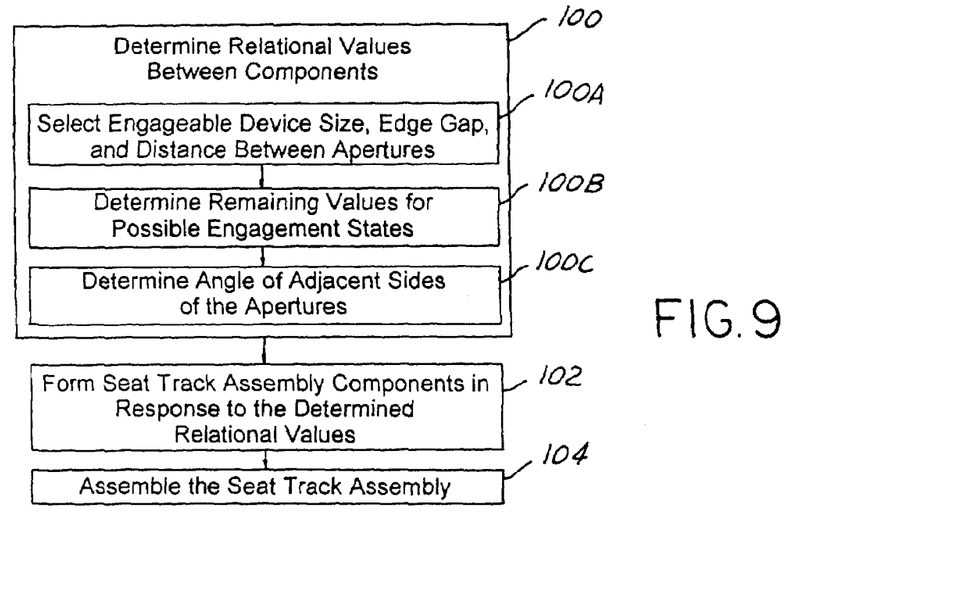
FIG. 9 is a logic flow diagram illustrating a method of manufacturing a positive seat track assembly in accordance with an embodiment of the present invention.

Referring now to FIG. 9, a logic flow diagram illustrating a method of manufacturing the positive seat track assembly 12 in accordance with an embodiment of the present invention is shown.

In step 100, relational values between components are determined for the engageable devices 42 and other components of the positive seat track assembly 12. For this example, the relationship of equation 1 is utilized.

In step 100A, several parameters are initially selected, engageable device size, such as diameter or $P_{min}$ and $P_{max}$, edge gap $G_2$, and distance d between the apertures 30.

In step 100B, equation 1 is used for the four possible engagement states, as stated above, to solve for unknown remaining values, such as the separation distances $n_1$ and $n_2$ the distance between device pairs $w_2$, and length $l_2$, using methods known in the art. For the example as described, since equations for states when a first and a third device are engaged and when a second and a fourth device are engaged are mathematically similar, only one equation is used to represent these two states. Thus, there are three equations corresponding to the three different engageable states and three unknown values to determine.

In step 100C, angles α are determined between adjacent sides 106. Using known techniques when the length $l_2$ and diameter of the engageable devices 42 are known, since the arches 98 correspond in size and shape as that of the engageable devices 42 the angles α may be easily determined.

In step 102, components of the track assembly 12 are formed in response to the determined relational values.

In step 104, the track assembly 12 is assembled upon formation of the stated components.

The present invention provides a track assembly having a latching mechanism with decreased resolution and a latch mechanism engagement-maintaining device that provides secondary engagement devices and aids in maintaining engagement of track members under various load conditions. The present invention is compact, cost effective, and provides manufacturing ease.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

The invention claimed is:

1. A positive engagement latching mechanism for a seat assembly of a vehicle comprising:
    a track member having a plurality of apertures that are engageable and a plurality of different separation distances between adjacent apertures of said plurality of apertures; and
    a plurality of engageable devices, each of which having a tapered engagement portion, said plurality of engageable devices positively engaging in at least two of said plurality of apertures;
    wherein engaged devices of said plurality of engageable devices engage in different apertures at any instance in time and during normal operation.

2. A mechanism as in claim 1 further comprising a plurality of biasing members biasing at least one of said plurality of engageable devices to be at least partially extended in said plurality of apertures.

3. A mechanism as in claim 2 wherein said plurality of biasing members comprise a plurality of leaf springs.

4. A mechanism as in claim 1 further comprising a release lever comprising a plurality of forks that when operated release said plurality of engageable devices.

5. A mechanism as in claim 1 further comprising a release lever that is biased by at least one biasing member to maintain smooth operation of said plurality of engageable devices.

6. A mechanism as in claim 1 wherein said plurality of engageable devices comprise:
  a first pair of engageable devices having a first separation distance; and
  a second pair of engageable devices having a second separation distance that is approximately twice that of said first separation distance.

7. A mechanism as in claim 6 wherein said first pair of engageable devices shares an engageable device with that of said second pair of engageable devices.

8. A mechanism as in claim 6 wherein said plurality of engageable devices comprises a third pair of engageable devices having a third separation distance that is approximately equal said first separation distance, distance between said first pair of engageable devices and said third pair of engageable devices twice that of said first separation distance.

9. A mechanism as in claim 1 wherein said plurality of engageable devices have a depth range of engagement.

10. A mechanism as in claim 1 wherein a first engageable device is in a fully extended engaged state and a second engageable device is in a minimally extended engaged state when the mechanism is engaged.

11. A mechanism as in claim 1 wherein aperture angles between adjacent sides of said plurality of apertures are such that when said plurality of engageable devices are in an engage state at least one of said engageable devices that is extended is not in contact with fore and aft edges of said plurality of apertures.

12. A mechanism as in claim 1 wherein said plurality of apertures are quadrilaterally shaped with opposing arches.

13. A mechanism as in claim 12 wherein said opposing arches have contours that correspond with contours of said plurality of engageable devices.

14. A mechanism as in claim 1 wherein said plurality of engageable devices are contained within art engageable device housing, said engageable device housing configured to couple an upper track member that is translatable in relation to a lower track member of a seat track assembly.

15. A latching mechanism engagement-maintaining system for a seat track assembly comprising:
  an engageable device housing having tapered sides tat are configured to correspond with at least one contour of an adjacent track member edge of the seat track assembly;
  a shear load resistive device coupled to said engageable device housing and configured to couple a track member of the seat track assembly and resisting vertical travel of said track member in relation to said engageable device housing; and
  a load guide coupled to said engageable device housing, configured to couple said track members and guiding direction of travel of said track member under loading conditions.

16. An engagement-maintaining system as in claim 15 wherein at least a portion of said engageable device housing is wedged shaped.

17. An engagement-maintaining system as in claim 15 wherein said load guide comprises a guide tab that resides in a track member slot.

18. An engagement-maintaining system as in claim 15 wherein said shear load resistive device shears at a predetermined load.

19. A seat track assembly comprising a latching mechanism engagement-maintaining system as recited in claim 15.

20. A method of manufacturing a positive seat track assembly comprising:
  determining relational values for a plurality of engageable devices of a positive engagement latching mechanism;
  determining angles between adjacent sides of a plurality of apertures within a track member, said angles are such that said plurality of apertures have a plurality of sides that continuously vary in width and narrow in width between center points and fore and aft edges of said plurality of apertures;
  forming said plurality of engageable devices in response to said determined relational values;
  forming said track member in response to said angles; and
  assembling the positive seat track assembly.

* * * * *

UNITED STATES PATENT AND TRADEMARK OFFICE
CERTIFICATE OF CORRECTION

| | | |
|---|---|---|
| PATENT NO. | : 7,082,854 B2 | Page 1 of 1 |
| APPLICATION NO. | : 10/249185 | |
| DATED | : August 1, 2006 | |
| INVENTOR(S) | : Neil G. Goodbred and David J. Abdella | |

It is certified that error appears in the above-identified patent and that said Letters Patent is hereby corrected as shown below:

In the Claims:

Claim 14:
Column 9, Line 47, should read as follows: --engageable devices are contained within an engageable--

Claim 15:
Column 10, Line 6, should read as follows: --an engageable device housing having tapered sides that are--

Claim 15:
Column 10, Line 16, should read as follows: --configured to couple said track member, and guiding--

Signed and Sealed this

Twenty-fourth Day of July, 2007

JON W. DUDAS
*Director of the United States Patent and Trademark Office*